(12) United States Patent
Sato et al.

(10) Patent No.: US 6,198,057 B1
(45) Date of Patent: Mar. 6, 2001

(54) ROTARY OPERATING-TYPE ELECTRONIC DEVICE

(75) Inventors: Jun Sato; Kenji Kataoka; Koji Ono, all of Okayama; Hiroshi Matsui, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/449,144

(22) Filed: Nov. 24, 1999

(51) Int. Cl.[7] ............................................. H01H 19/00
(52) U.S. Cl. ..................................... 200/28; 200/4
(58) Field of Search ........................... 200/11 D, 11 DA, 200/11 G, 4, 28

(56) References Cited

U.S. PATENT DOCUMENTS

| 5,204,502 | 4/1993 | Ferris et al. | |
|---|---|---|---|
| 5,828,364 | * 10/1998 | Siddiqui | 345/163 |
| 5,847,335 | 12/1998 | Sugahara et al. | |
| 5,886,310 | * 3/1999 | Kataoka et al. | 200/14 |
| 5,894,118 | 4/1999 | Nishimoto et al. | |
| 5,912,661 | * 6/1999 | Siddiqui | 345/166 |

* cited by examiner

Primary Examiner—Michael L. Gellner
Assistant Examiner—Nhung Nguyen
(74) Attorney, Agent, or Firm—Ratner & Prestia

(57) ABSTRACT

A rotary operating-type electronic device used mainly in a peripheral apparatus such as a mouse for computers, portable telephones, an electronic device mounted on an automobile, and the like, in which a rotary type component and a linearly-driven type component are operated by a rotating manipulation of an operating knob attached to an operating axle and a tilting manipulation of the same knob in a direction orthogonal to an axis of the operating axle. The device is so constructed that the operating axle is supported to be rotatable together with a rotary encoder unit and also tiltable, by fitting an end of the operating axle in an axle-supporting portion having a non-circular center hole of a rotor of the rotary encoder. An operating knob of either a discal shape or a polygonal shape having a predetermined width is attached to an intermediate portion of the operating axle that protrudes from the rotor, and a push switch is disposed in a position to be in contact with another end of the operating axle.

17 Claims, 9 Drawing Sheets

ROTARY OPERATING-TYPE ELECTRONIC DEVICE

FIELD OF THE INVENTION

The present invention relates to a rotary operating-type electronic device used mainly in peripheral apparatuses such as a mouse as a computer peripheral, portable telephones, electronic devices mounted on automobiles, and the like.

BACKGROUND OF THE INVENTION

Some examples of an ordinary rotary operating-type electronic device include a variable resistor for providing a desired resistance, an encoder for providing an output of electric signal, and so on by way of turning an operating axle. These rotary operating-type electronic devices are provided with an operating axle in a position coaxial with a center of rotation, and fixed along the rotary axis, so that the operating axle is movable only in a direction of the rotation, or the direction of rotation and a direction of the axis.

A rotary encoder equipped with a push switch will be described hereinafter, as a representative of the rotary operating-type electronic device of the prior art, by referring to FIG. 11 depicting a cross-sectional view thereof.

In FIG. 11, an operating axle 31 is inserted into a circular hole 32A of a bearing 32 from underneath of it, and a center circular portion 31A is held fitted in the circular hole 32A in a manner that the operating axle 31 is rotatable as well as vertically movable. A thin non-circular spindle 31B at a lower end of the operating axle 31 fits into a non-circular hole 33A in a center of a rotary contact board 33 in such a manner that a rotary movement of the operating axle 31 is transferred to the rotary contact board 33 whereas a vertical movement is not.

The rotary contact board 33 stays in its vertical position by being held between the bearing 32 and a case 34 beneath the rotary contact board 33. The rotary contact board 33 is provided on its lower surface with a contact plate 35 by an insert molding. The contact plate 35, which functions as movable contacts, includes a center ring portion 35A and a plurality of rectangular web portions 35B extending radially from the center ring portion 35A, as shown in FIG. 12, i.e. a plan view depicting an underside surface thereof.

The case 34 is provided with flexible contacts 36A, 36B and 36C, all serving as stationary contact points. The flexible contact 36A resiliently stays in contact with the center ring portion 35A, and the flexible contacts 36B and 36C resiliently stay in contact with the rectangular web portions 35B of the contact plate 35 respectively. And, all of the above elements constitute a rotary encoder unit. The flexible contacts 36B and 36C are so positioned that they are slightly shifted with each other in a direction of the rotation.

Further, a push switch 37 is disposed under the case 34, and a lower end 31C of the operating axle 31 locates in touch with an upper end of a push button 37A of the push switch 37.

An operation of the rotary encoder equipped with a push switch is described hereinafter. When an operating knob 39 attached on an upper end 31D of the operating axle 31 is rotated, it turns the rotary contact board 33 together with the rotation of the operating axle 31. The three flexible contacts 36A, 36B and 36C facing against the contact plate 35 on the lower surface of the rotary contact board 33 slide on a surface of the center ring portion 35A and the rectangular web portions 35B, and generate pulse signals between the terminals 38A and 38B, as well as the terminals 38A and 38C among the three terminals 38A, 38B and 38C connected to their respective flexible contacts, thereby functioning as an encoder.

In the above operation, there is a time delay between the pulse signals generated between the terminals 38A and 38B, and between the terminals 38A and 38C, due to the shift in positions of the flexible contacts 36B and 36C, which are in contact with the rectangular web portions 35B of the contact plate 35. This allows a circuit of an apparatus, which employs this device, to detect a direction of the rotation, and thereby it is able to function according to the direction and an amount of the rotation.

Also, the operating axle 31 is so constructed that it is not movable in the vertical direction during this rotating manipulation, so that the push switch 37 does not function.

When the operating axle 31 is moved downward by applying a depressing force to the operating knob 39 attached to the upper end 31D of the operating axle 31, as shown by an arrow 100 in FIG. 13, i.e. a cross sectional view of the device, the lower end 31C depresses the push button 37A to operate the push switch 37.

The rotary encoder unit does not function during this manipulation, because the rotary contact board 33 does not move downward, nor does it rotate.

However, since the rotary operating-type electronic device of the prior art operates only in the direction of rotation and the direction of axis of the operating axle 31 attached to the operating knob 39, it substantially restricts freedom in designing the apparatuses that employ these devices.

An object of the present invention is to solve the foregoing problem, and to provide a rotary operating-type electronic device that is capable of operating a linearly-driven type component in addition to a rotary type component by rotating and tilting an operating axle provided with an operating knob.

SUMMARY OF THE INVENTION

A rotary operating-type electronic device of the present invention includes, (1) a rotary type component including a stationary body and a rotor having a non-circular hole in a rotational center thereof, and supported rotatably by the stationary body, (2) an operating axle fitted and supported at one end thereof by the non-circular hole of the rotor in such a manner that it rotates together with the rotor and is freely tiltable, (3) an operating knob of either a discal shape or a polygonal shape having a predetermined width, and attached to either of an intermediate portion and another end portion of the operating axle protruding from the rotor, and (4) a linearly-driven type component disposed in a manner to be in touch with an outer periphery of the operating axle protruding from the rotor at either of end portion and an intermediate portion, and operated by a tilting manipulation of the operating axle.

The structure as described above realizes the rotary operating-type electronic device, in which the rotary type component is operable by a rotating manipulation of the operating knob having either a discal or polygonal shape with the predetermined width attached to the operating axle, and the linearly-driven type component is operable by a tilting manipulation of the same operating axle by depressing an upper peripheral surface of the same operating knob.

Also, a rotary operating-type electronic device of the present invention includes, (1) a rotor having a non-circular hole in a rotational center thereof, and supported rotatably by a stationary body of a rotary type component including a stationary contact board and the like, (2) an operating axle fitted and supported at one end thereof by the non-circular hole of the rotor in such a manner that it rotates together with the rotor and is freely tiltable, (3) an operating knob of either a discal shape or a polygonal shape having a predetermined width, and attached to one of (a) an intermediate portion and (b) another end portion of the operating axle protruding from the rotor of the rotary type component, and (4) a linearly-driven type component disposed in a manner to be in touch with an outer periphery of the operating axle protruding from the rotor of the rotary type component at one of (c) an end portion and (d) an intermediate portion, and operated by a tilting manipulation of the operating axle.

The simple structure as described above realizes the rotary operating-type electronic device, in which the rotary type component is operable by a rotating manipulation of the operating knob having either a discal or polygonal shape with the predetermined width attached to the operating axle, and the linearly-driven type component is operable by a tilting manipulation of the same operating axle.

Further, the rotary operating-type electronic device of the present invention has a structure in that the non-circular hole provided in a rotational center of the rotor includes two portions, a non-circular hole portion formed through a certain portion of a width of the rotor, and the other portion formed through a remaining width portion of the rotor as a clearance hole portion having a diameter greater than a diameter of the non-circular hole. The operating axle has an exterior shape substantially identical to a shape of the non-circular hole, and one end of it is fitted into and supported by the non-circular hole portion.

This structure provides the device with such advantages that operating axles in large quantity can be manufactured easily by simply cutting a length of bar material having a uniform cross-section of non-circular shape, and that operating axles of any length can be prepared readily.

Moreover, the rotary operating-type electronic device of the present invention is provided with the rotor, of which the non-circular hole is substantially regular polygonal, and that one end of the operating axle that fits into the hole is also substantially regular polygonal.

The structure adopting the shape of regular polygon for the fitting portion provides the operating axle with a smooth tilting movement at any rotating angle of the rotor.

In another structure of the rotary operating-type electronic device of the present invention, the non-circular hole of the rotor is formed in a shape of substantially regular polygon, and the operating axle is provided at one end thereof with a polygonal sphere having a cross section substantially identical to the substantially regular polygonal hole. The one end of the operating axle is fitted into and supported by the substantially regular polygonal hole.

This structure adopting the cross-sectional shape of regular polygon for the fitting portion also provides the operating axle with a smooth tilting movement at any rotating angle of the rotor. In addition, the structure provides an advantage of reducing a play angle of the operating axle during rotary manipulation of it, as a diameter of the fitting portion is increased.

Also, the rotary operating-type electronic device of the present invention is provided with a push switch as the linearly-driven type component, so that it functions when the operating axle is depressed in a direction orthogonal to an axis of the operating axle.

The above structure can easily realize a rotary operating-type electronic device employing a push switch, which is a type of components used widely for peripheral apparatuses of computers, portable telephones, electronic devices mounted on automobiles, and the like.

Furthermore, the rotary operating-type electronic device of the present invention is so constructed that (1) the operating knob of either generally discal or generally polygonal shape having a predetermined width is attached to generally center portion of the operating axle, and (2) the rotary type component and the linearly-driven type component are constructed in such a shape that a height is tallest at a portion closest to the operating knob, and the height declines gradually toward a side farther away from the operating knob, and that the height is also tallest at a center portion in a plane orthogonal to the operating axle, and it declines at both right and left sides.

This structure provides an advantage that the device can be assembled easily into a mouse used for computers and the like, while also reducing overall dimensions of the mouse containing it.

In the rotary operating-type electronic device of the present invention, the rotary type component is provided further with a contact plate and a flexible contact on the stationary body, so that the contact plate and the flexible contact constitute a rotary encoder.

The structure thus realizes an encoder for producing an output of electric signal by turning the operating axle.

Also, the rotary operating-type electronic device of the present invention has a plurality of ditches and ridges formed radially along a perimeter on one of surfaces of the rotor, and a click spring mounted on the stationary body and pressing resiliently against the ditches and ridges.

This structure provides a click feeling for a user making a rotary manipulation. The structure also prevents the rotary type component from being rotated, if a rotational force is applied inadvertently to the operating knob of either generally discal or generally polygonal shape having a predetermined width while being pushed downward.

Further, the rotary operating-type electronic device of the present invention is provided further with an axle return spring. The axle return spring biases the operating axle in a direction that it returns the operating axle to its original position, when a tilting force being applied to it is removed.

This structure allows the linearly-driven type component to make an open and close operation quickly. The structure also prevents the linearly-driven type component from operating erroneously, even if a small depressing force is applied inadvertently to the operating knob of either generally discal or generally polygonal shape having a predetermined width while being rotated.

Moreover, the rotary operating-type electronic device of the present invention is provided further with a variable resistor as the rotary type component. The variable resistor changes a value of resistance thereof in response to a turn of the operating knob of either a discal shape or a polygonal shape having a predetermined width.

The structure thus realizes a variable resistor for providing a desired value of resistance by turning the operating axle.

DESCRIPTION OF THE PREFERRED EMBODIMENTS

Preferred exemplary embodiments of the present invention are described hereinafter by referring to the accompanying figures.

First Exemplary Embodiment

Figure 1:
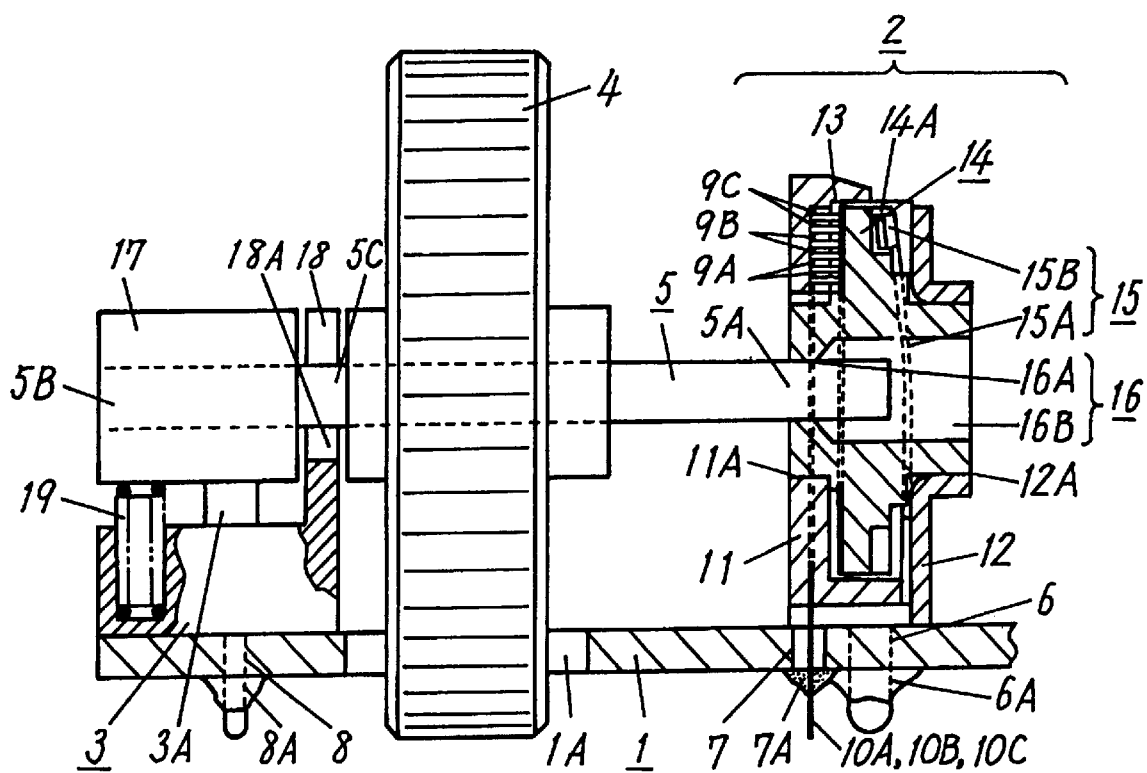
FIG. 1 is a side view, in which an essential portion is partially sectioned, depicting a rotary encoder equipped with a push switch of a first exemplary embodiment of the present invention.
Figure 2:
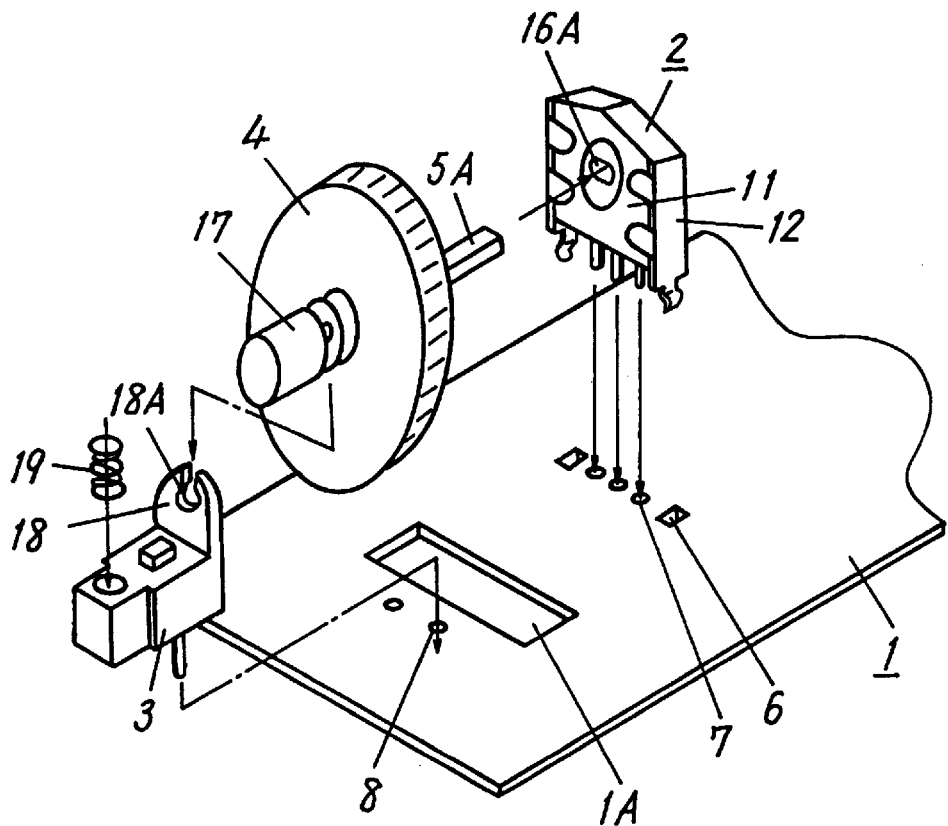
FIG. 2 is an exploded perspective view of the same rotary encoder equipped with a push switch.

FIG. 1 is a side view, in which an essential portion is partially sectioned, depicting a rotary encoder equipped with a push switch, as a representative of a rotary operating-type electronic device of a first exemplary embodiment of the present invention, and FIG. 2 is an exploded perspective view of the same rotary encoder. As shown in FIGS. 1 and 2, the rotary encoder equipped with a push switch includes a rotary encoder unit 2 (hereinafter referred to as "encoder unit 2") and a push switch 3 as a linearly-driven type component, both of which are disposed on a mounting plate 1. An operating axle 5 provided with a discal operating knob 4 is positioned between the encoder unit 2 and the push switch 3.

The mounting plate 1 is provided with a mounting hole 6 and terminal insertion holes 7 for the encoder unit 2, terminal insertion holes 8 for the push switch 3, and a clearance opening 1A for the discal operating knob 4. The mounting plate 1 is also provided with conductor lands 6A, 7A, and 8A for soldering on an underside surface of the mounting plate 1 around the mounting hole 6, and the terminal insertion holes 7 and 8 respectively.

Also, the encoder unit 2 includes a stationary body having a stationary contact board 11 in the front side and a cover 12 in the back, a rotor 14, and a click spring 15. The stationary contact board 11 is formed, by insertion-forming, to have three sets of flexible contact 9A, 9B and 9C representing the stationary contacts, and three terminals 10A, 10B and 10C communicating with their respective flexible contacts. The rotor 14 is rotatably supported between a center opening 11A of the stationary contact board 11 and a center opening 12A of the cover 12. The rotor 14 is provided on a front surface thereof with a contact plate 13, as a movable contact, to which the flexible contacts 9A, 9B, and 9C maintain resilient contact. The stationary body and the rotor 14 constitute a rotary type component. The click spring 15 is attached to a front surface of the cover 12, and a dowel 15B at a tip of a flexible pillar 15A stays resiliently in contact with a plurality of radially oriented ditches and ridges 14A provided along a periphery on a back surface of the rotor 14. The dowel 15B at the tip of the flexible pillar 15A of the click spring 15 stays fit in one of the radially oriented ditches 14A under a normal standing condition.

Figure 3:
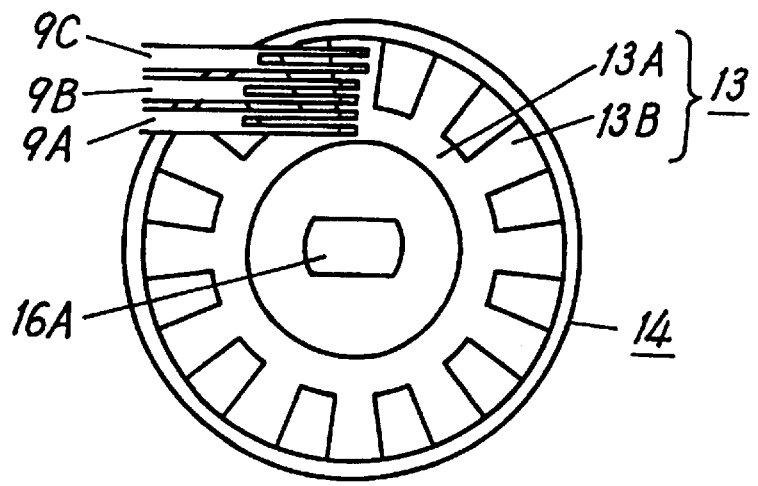
FIG. 3 is a front view depicting a rotor of the same rotary encoder equipped with a push switch.

The contact plate 13 is in a shape that includes a center ring portion 13A and a plurality of rectangular web portions 13B extending radially from the center ring portion 13A, as shown in the rotor 14 of FIG. 3. Among the three flexible contacts 9A, 9B, and 9C, two contacts 9B and 9C that maintain resilient contact with the rectangular web portions 13B are positioned so that they are slightly shifted from each other in a direction of the rotation, in the same manner as those of the prior art device.

The rotor 14 is provided in a center thereof with a hole 16, which includes a hole 16A having a shape of parallel-sided ellipse in a thin portion at a front side and functioning as an axle-supporting portion 16A, and a circular clearance portion 16B having a diameter greater than that of the axle-supporting portion 16A for a remaining width portion at a back side of the rotor 14. An end portion 5A of the operating axle 5 has an exterior shape generally similar to the hole of the axle-supporting portion 16A. The end portion 5A of the operating axle 5 having the generally similar exterior shape as the parallel-sided ellipse hole of the axle-supporting portion 16A is inserted in the axle-supporting portion 16A in a manner that the operating axle 5 is rotatable together with the rotor 14 as well as freely tiltable can swing to the right or the left.

A discal operating knob 4 is attached to a center portion of the operating axle 5 so as to rotate together. The mounting plate 1 has a clearance opening 1A in a portion under the discal operating knob 4. A circular sleeve 17 is inserted into another end portion 5B of the operating axle 5 in a manner that an outer surface of the sleeve 17 is in contact with top surface of a push button 3A of the push switch 3. An intermediate portion 5C of the operating axle 5 locates between one side of the circular sleeve 17 and the discal operating knob 4. An axle-retaining portion 18 extends upwardly from one end of an enclosure of the push switch 3, and it has an elongated hole 18A. The intermediate portion 5C of the operating axle 5 is positioned in the elongated hole 18A, so that movement of the operating axle 5 is restricted only in a vertical direction. In an ordinary condition, the operating axle 5 is pressed against an upper end in the elongated hole 18A of the axle-retaining portion 18 by an upward tension of an axle return spring 19 mounted on a side of the push switch 3.

The rotary encoder equipped with a push switch operates in a manner, which is described next.

First, when the discal operating knob 4 is rotated by a force applied to an outer surface thereof in a tangential direction, the operating axle 5 rotates, and thereby the rotor 14 also rotates, as the end portion 5A having the parallel-sided ellipse shape of the operating axle 5 is fitted in the axle-supporting portion 16A also having the same shape of the hole 16 in the rotor 14. As the rotor 14 rotates, the three flexible contacts 9A, 9B, and 9C placed in resilient contact with the contact plate 13 slide on a surface of the center ring portion 13A and the rectangular web portions 13B, and generate pulse signals between the terminals 10A and 10B, as well as the terminals 10A and 10C amongst the three terminals 10A, 10B and 10C connected to their respective flexible contacts, thereby functioning as an encoder.

During the above operation, a time delay occurs between the pulse signals generated between the terminals 10A and 10B, and between the terminals 10A and 10C, due to the shift in positions of the flexible contacts 9B and 9C, which are both in contact with the rectangular web portions 13B of the contact plate 13. This time delay allows a circuit of an apparatus equipped with this device to detect a direction of the rotation, and thereby it is able to function according to the direction and an amount of the rotation, in the same manner as the prior art device.

The dowel 15B at a tip of the flexible pillar 15A of the click spring 15, previously in one of the radially oriented ditches 14A on the back surface of the rotor 14, comes out of the ditch, slides resiliently over the radially oriented ditches and ridges 14A while producing clicking feelings to an operator, and slides into another ditch in a new rest position.

During this movement, the operating axle 5 does not move downward and the push switch 3 remains not operative, since it is forced to stay in the upper position with the tension of the axle return spring 19.

Figure 4:
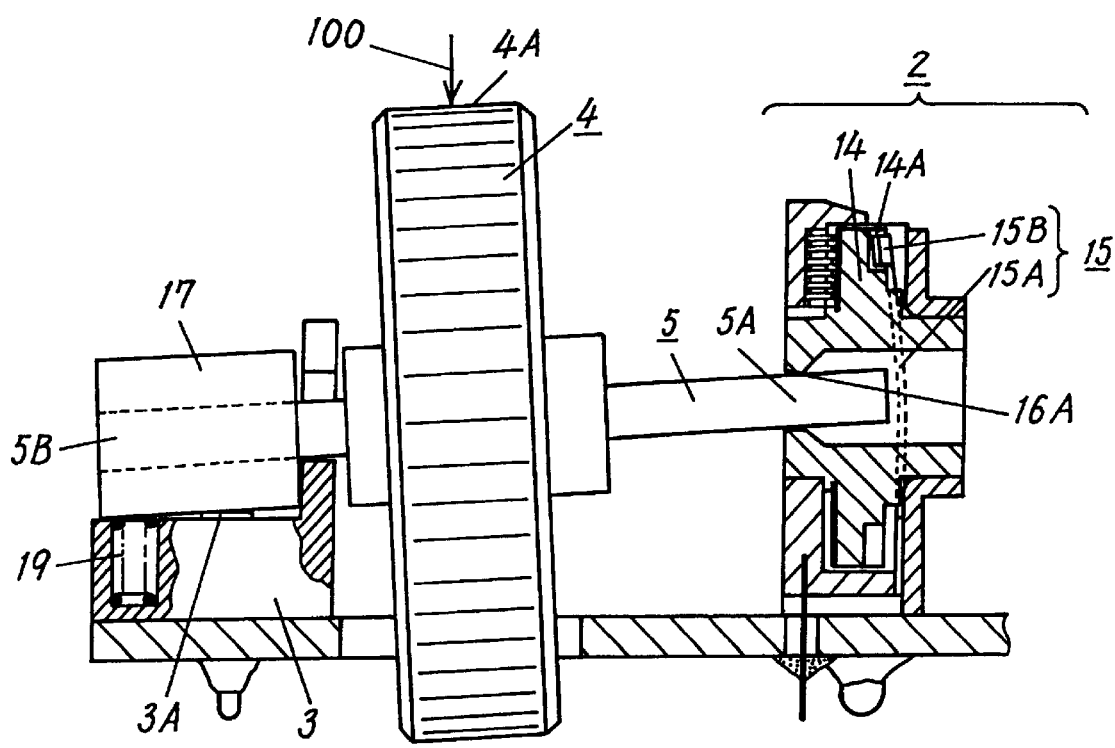
FIG. 4 is a side view, in which an essential portion is partially sectioned, of the same rotary encoder equipped with a push switch, depicting a state that an operating axle is in its tilted position.

Next, when a top portion 4A of the discal operating knob 4 is depressed against the tension of the axle return spring 19 in a direction of an arrow 100 shown in a side view of FIG. 4, the operating axle 5 tilts in such a manner that the end portion 5B moves downward while the other end portion 5A of the operating axle 5 functions as a fulcrum, as it fits in the axle-supporting portion 16A having the parallel-sided ellipse shape of the hole 16 in the rotor 14 in the encoder unit 2. This causes the sleeve 17 at the end portion 5B of the operating axle 5 to operate the push switch 3, since the sleeve 17 depresses the push button 3A of the push switch 3, which is in contact with a lower surface of the sleeve 17. The operating axle 5 and the discal operating knob 4 are pushed back upward by the tension of the axle return spring 19, when the depressing force is removed from the discal operating knob 4. At the same time, the push button 3A of the push switch 3 also returns to its original position shown in FIG. 1 by its own restoring spring action.

The encoder unit 2 does not function during this manipulation of depressing the discal operating knob 4 and tilting the operating axle 5, because the rotor 14 does not rotate, since the dowel 15B of the flexible pillar 15A of the click spring 15 remains in one of the radially oriented ditches 14A on the back surface of the rotor 14 in the encoder unit 2.

As described above, the present exemplary embodiment realizes the rotary encoder equipped with a push switch that is adaptable for a variety of applications, since the encoder unit 2 is operable by a rotating manipulation of the discal operating knob 4 attached to the operating axle 5, and the push switch 3 is operable by a tilting manipulation of the operating axle 5 by depressing an outer surface of the same operating knob 4.

Figure 5:
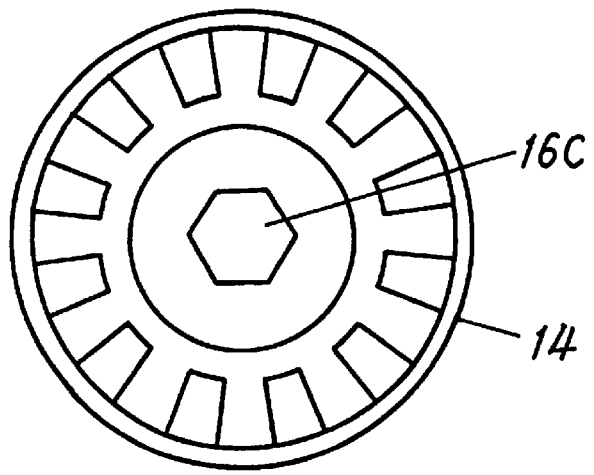
FIG. 5 is a front view depicting a rotor having a different shape for the same rotary encoder equipped with a push switch.

The present exemplary embodiment is an example, in which the rotor 14 is provided with the axle-supporting portion 16A in the shape of parallel-sided ellipse in the center hole 16, and the operating axle 5 has an outer diameter of the similar shape. However, tilting manipulation of the operating axle 5 can be made more smoothly, if the axle-supporting portion 16A and the operating axle 5 are formed into a regular polygonal shape such as a regular hexagonal hole 16C as shown in a front view of another rotor in FIG. 5.

Figure 6:
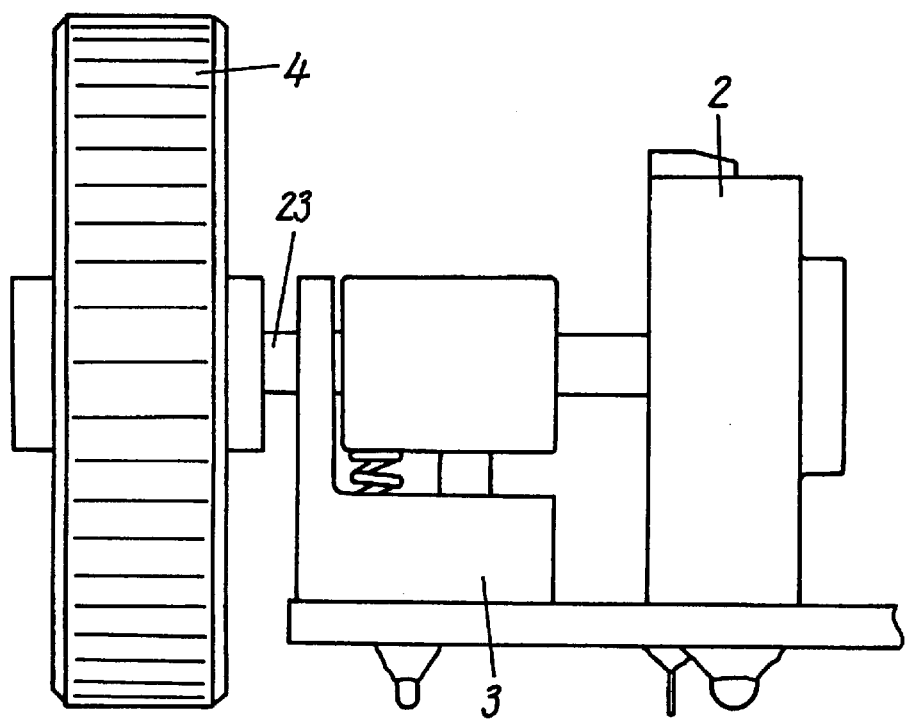
FIG. 6 is a side view depicting another structure of the same rotary encoder equipped with a push switch.

Also, the exemplary embodiment described above is an example, in which the discal operating knob 4 for manipulating the encoder unit 2 and the push switch 3 is disposed between the encoder unit 2 and the push switch 3. However, the structure can be altered so that the push switch 3 is arranged in a position between the encoder unit 2 and the discal operating knob 4, as shown in a side view of FIG. 6, depending on the apparatus employing the rotary encoder. This structure can increase a depressing stroke of the discal operating knob 4, when depressing the discal operating knob 4 to tilt an operating axle 23.

Second Exemplary Embodiment

Figure 7:
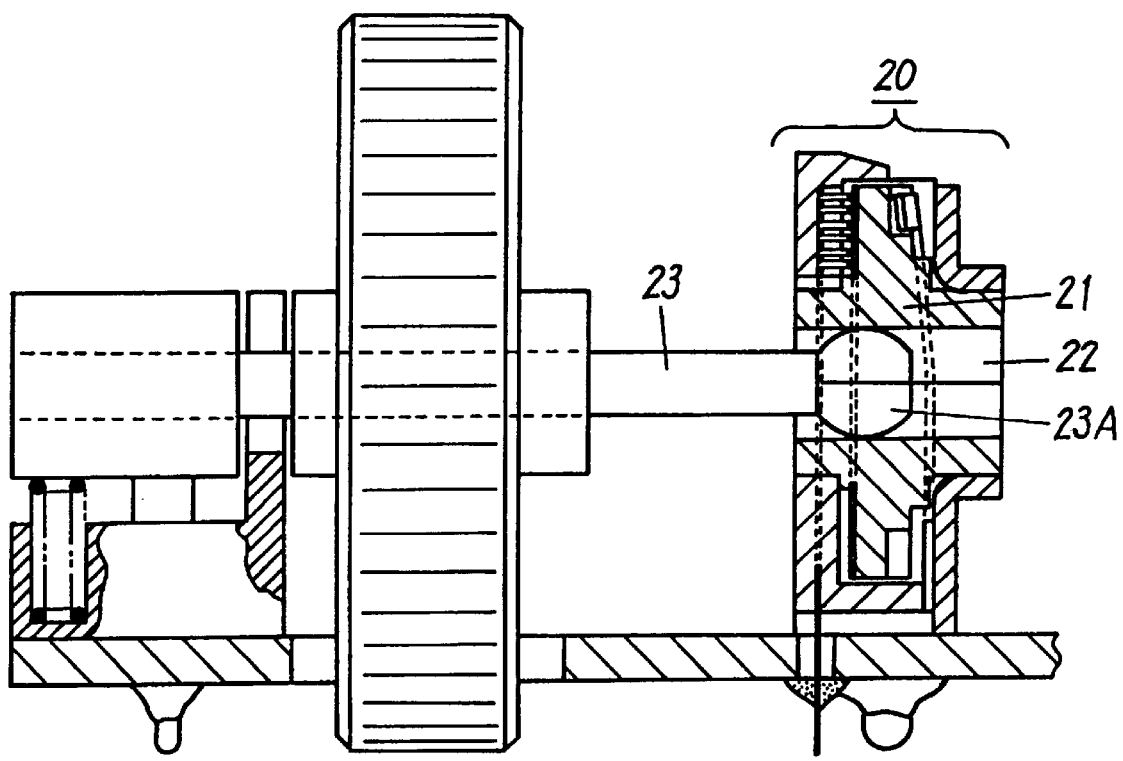
FIG. 7 is a side view, in which an essential portion is partially sectioned, depicting a rotary encoder equipped with a push switch of a second exemplary embodiment of the present invention.

FIG. 7 is a side view, in which an essential portion is partially sectioned, depicting a rotary encoder equipped with a push switch, as a representative of a rotary operating-type electronic device of a second exemplary embodiment of the present invention. The rotary encoder equipped with a push switch of this exemplary embodiment differs in shape of a center hole 22 of a rotor 21 in an encoder unit 20 as well as an operating axle 23 fitting therein, from that of the above-described first exemplary embodiment.

That is, the center hole 22 in the rotor 21 is uniformly bored through preferably in a regular hexagonal shape, and fitting therein is a large-size regular hexagonal sphere 23A having a cross-section of regular hexagon at one end of the operating axle 23. Structure of other components of the present rotary encoder equipped with a push switch is identical to that of the first exemplary embodiment.

Details of the rotary encoder equipped with a push switch of this exemplary embodiment is not be described, since it operates exactly in the same manner as that of the first exemplary embodiment.

Accordingly, the structure of this exemplary embodiment enables the operating axle 23 to be manipulated more smoothly in any angle of rotating position of the rotor 21 as compared to that of the first exemplary embodiment. The structure can also reduce a play angle of the operating axle 23, since a diameter of the center hole 22 in the rotor 21 and the diameter of the large regular hexagonal sphere 23A at the end of the operating axle 23 fitting therein can be increased.

The center hole 22 in the rotor 21 and the large regular hexagonal sphere 23A at the end of the operating axle 23 to be fitted therein need not be restricted to the regular hexagonal shape, but they can be of any shape of regular polygon such as an octagon or a dodecagon, as a matter of course.

Third Exemplary Embodiment

Figure 8:
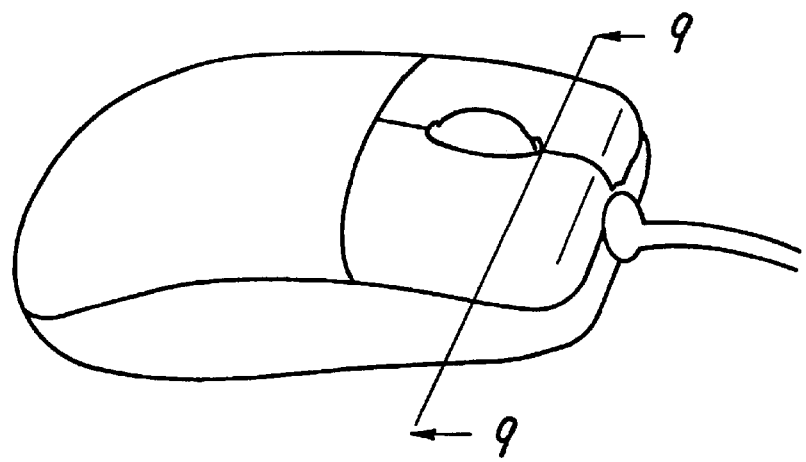
FIG. 8 is a general perspective view depicting a mouse employing a rotary encoder equipped with a push switch of a third exemplary embodiment of the present invention.
Figure 9:
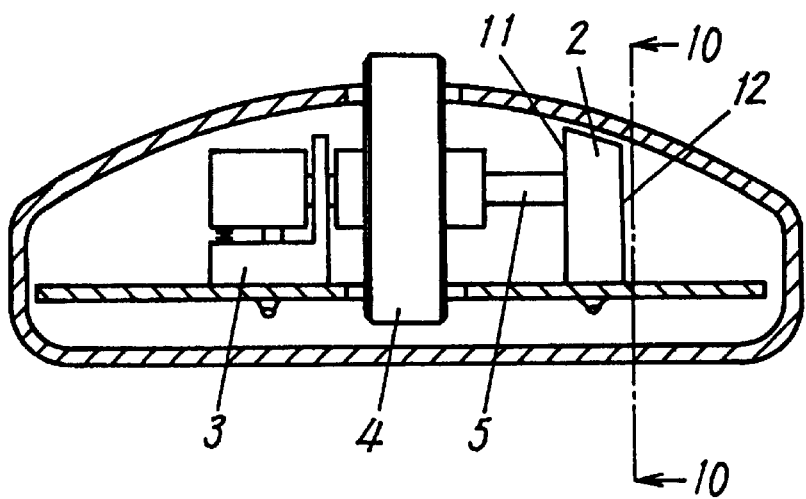
FIG. 9 is a sectional view taken along a line 9—9 shown in the mouse of FIG. 8.
Figure 10:
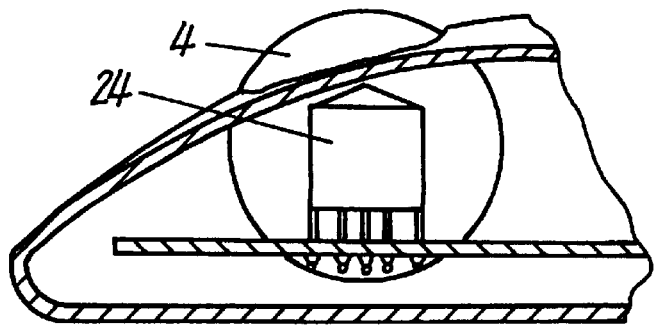
FIG. 10 is a sectional view taken along a line 10—10 shown in FIG. 9 of the same mouse.
Figure 11:
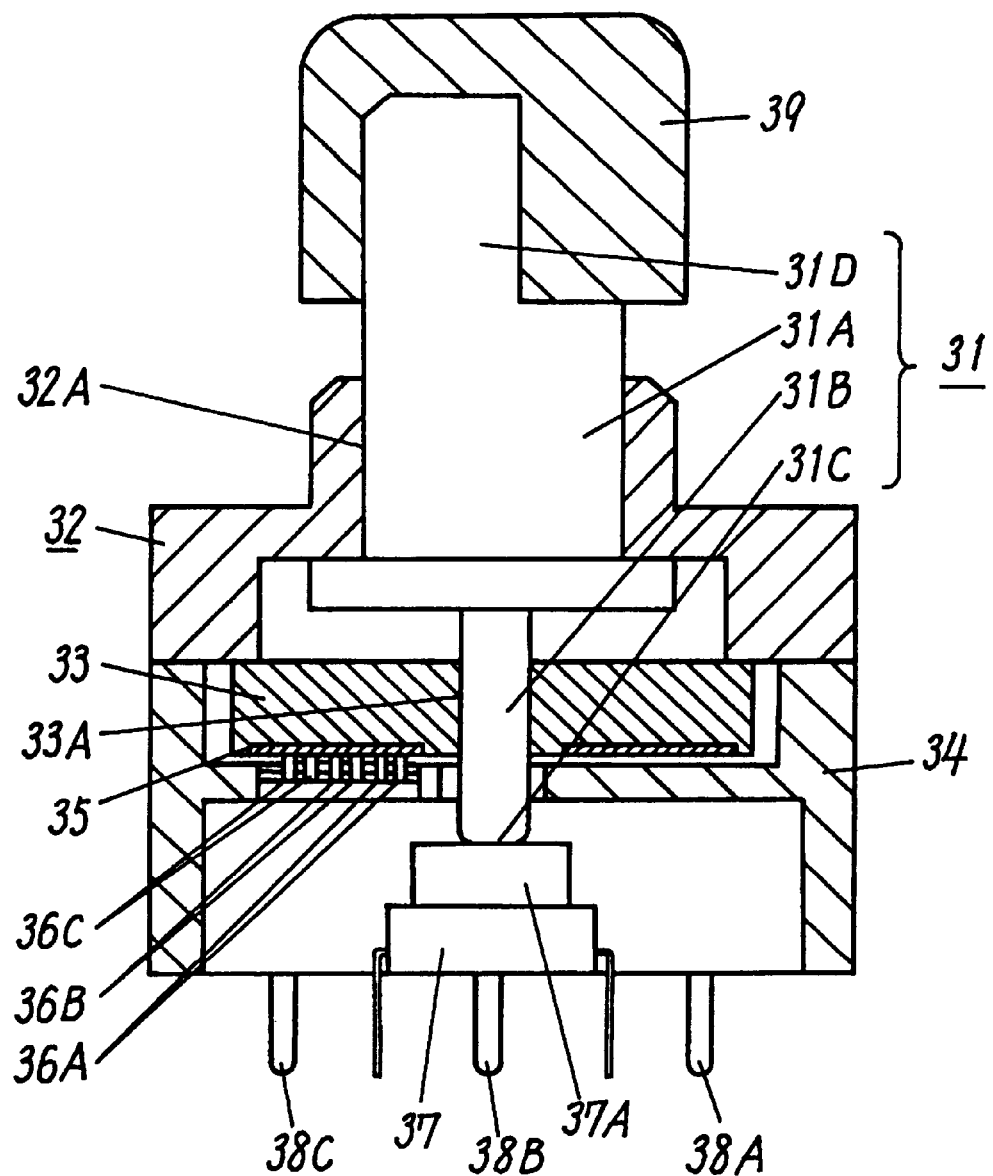
FIG. 11 is a longitudinal sectional view depicting a rotary encoder equipped with a push switch of the prior art.
Figure 12:
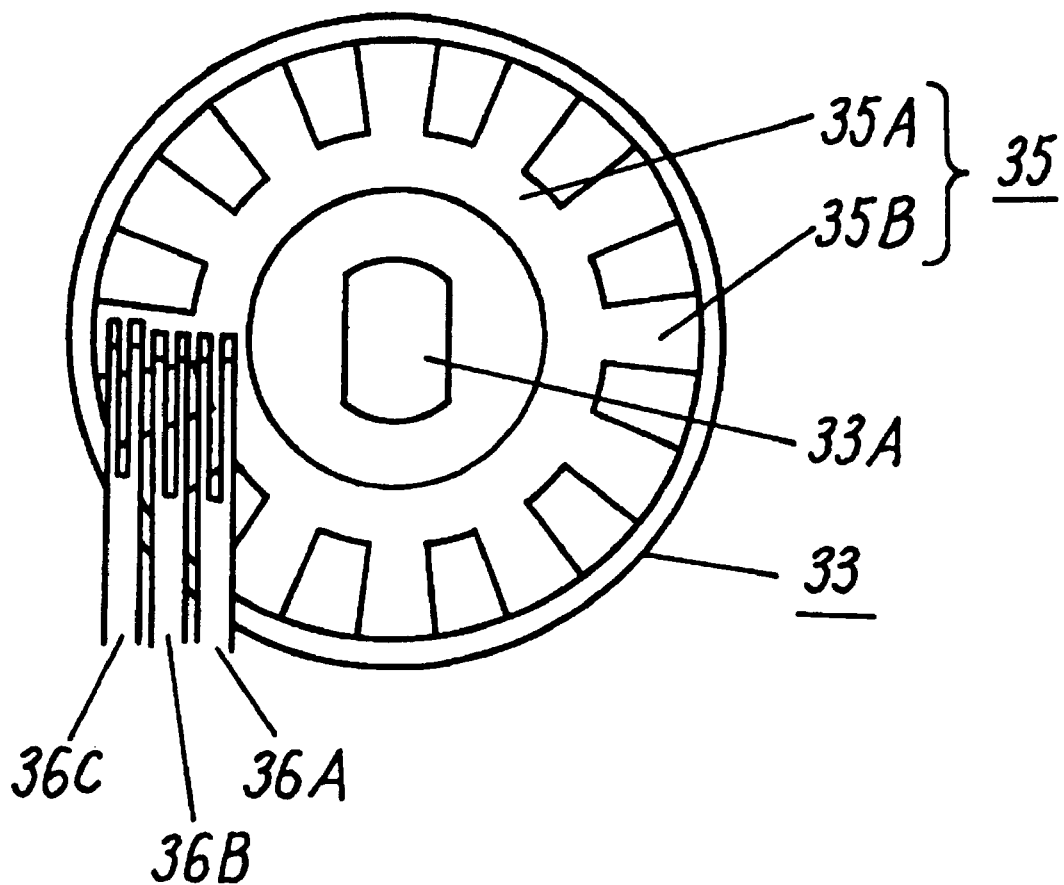
FIG. 12 is a plan view depicting a lower surface of a rotary contact board of the same rotary encoder equipped with a push switch.
Figure 13:
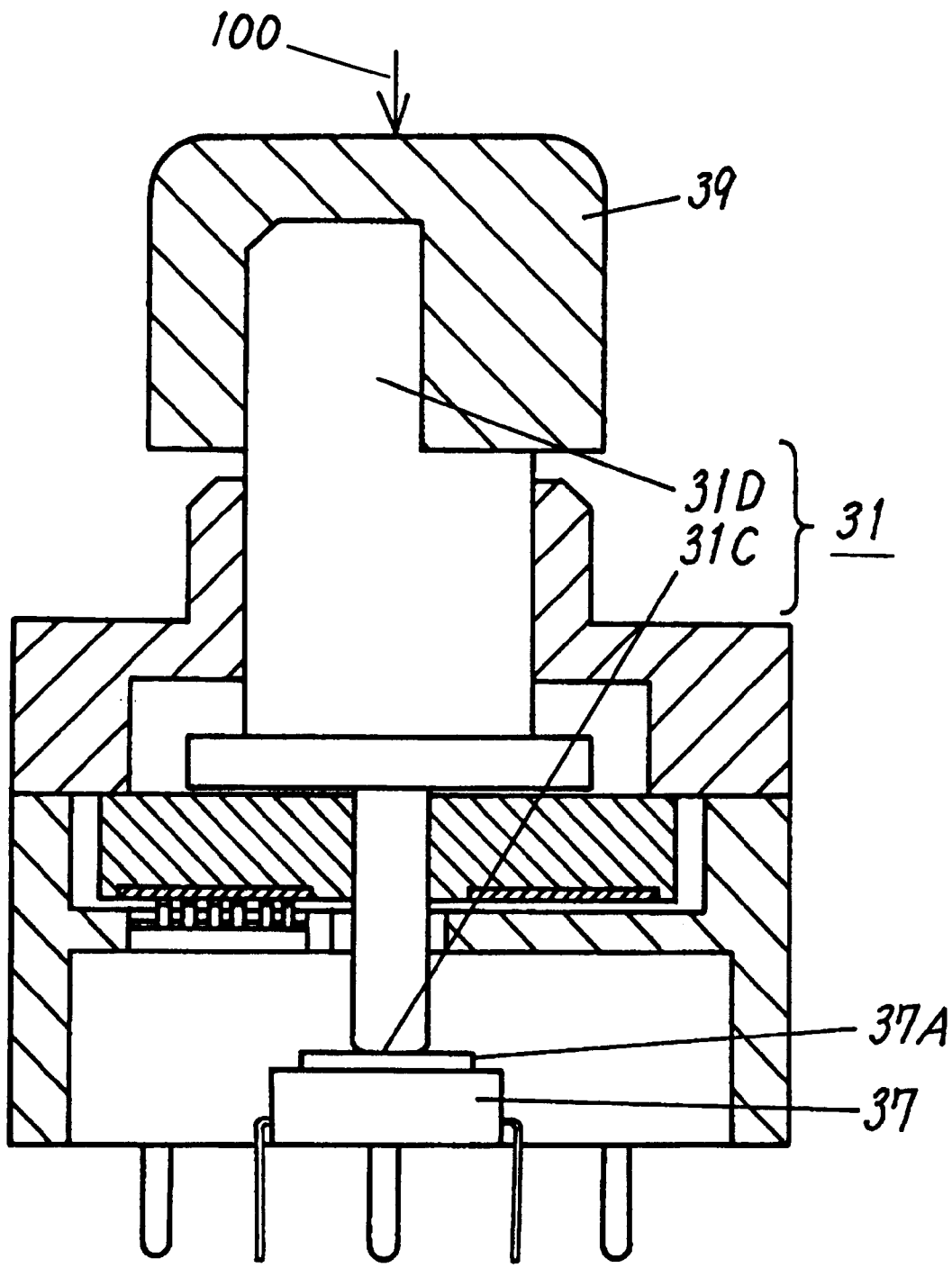
FIG. 13 is a longitudinal sectional view of the same rotary encoder equipped with a push switch, depicting a state that an operating axle is in its depressed position.

FIG. 8 is a general perspective view depicting a mouse employing a rotary encoder equipped with a push switch, representing a rotary operating-type electronic device, of a third exemplary embodiment of the present invention, FIG. 9 is a sectional view taken along a line 9—9 shown in FIG. 8, and FIG. 10 is a sectional view taken along a line 10—10 shown in FIG. 9.

As shown in FIGS. 9 and 10, a basic structure of the rotary encoder equipped with a push switch of the present exemplary embodiment, and its operation are same as what have been described in the first exemplary embodiment. However, in the present rotary encoder equipped with a push switch, an enclosure covering an encoder unit 24 is so constructed that a height is tallest at a side of a stationary contact board 11, i.e. the side closest to a discal operating knob 4, and the height becomes lowest at a side of a cover 12, i.e. the side farthest from the discal operating knob 4. The height of the enclosure is also tallest at a center portion in a plane orthogonal to an operating axle 5, and it declines at both right and left sides.

In mounting the rotary encoder equipped with a push switch into a mouse, the foregoing structure increases a degree of freedom in designing the mouse in such a way that a top portion of a shell of the mouse can be raised highest around the discal operating knob 4 in order to enhance ease of handling.

In order to provide the dimensional difference in height of the enclosure covering the encoder unit 24, it is essential to make a structural arrangement in such a manner that certain components such as the stationary contact board 11 are positioned at a side closer to the operating knob 4 as their dimensional restrictions cause a substantial effect to performance of the encoder unit 24, and other components such as the click spring 15 (FIG. 1) are positioned at a side opposite to the operating knob 4 because their dimensional restrictions have a little effect to the performance.

Although nothing has been described of the push switch 3 because of its smaller profile as compared to the encoder unit 24, it is also desirable to construct the push switch 3 in the similar shape so that a height is tallest at the side near the discal operating knob 4, and the height becomes lowest at the opposite side thereof.

Although the operating knob has been described as having a discal shape in the above exemplary embodiments of the invention, it may be of any other shape such as a cylindrical shape having a certain width. If the width is so arranged to be large enough for providing a wide manipulating surface area, it can give a good fit for a finger and easily improves usability. A similar effect and advantage as described above can also be attained with an operating knob having a polygonal shape.

Although what has been described in the above exemplary embodiments of the invention is one example employing a push switch, it needs not be restrictive to the push switch. But any kind of linearly-driven type components may be used.

Furthermore, although the described exemplary embodiments of the present invention have referred mainly to the rotary encoder equipped with a push switch, the invention can also be adaptable for a variable resistor equipped with a push switch, which can provide a desired value of resistance by turning an operating axle, if the rotary encoder unit is replaced by a variable resistor unit.

As has been described, the present invention is useful in realizing a rotary operating-type electronic device, in which a rotary type component is operable by a rotating manipulation of a discal operating knob attached to an operating axle, and a linearly-driven type component is operable by a tilting manipulation of the operating axle by depressing an outer surface of the discal operating knob.

Reference numerals

1 Mounting plate
1A Clearance opening
2, 20, 24 (Rotary type) Encoder unit
3 Push switch
3A Push button
4 Discal operating knob
4A Upper portion
5, 23 Operating axle
5A End portion
5B Another end portion
5C Intermediate portion
6 Mounting hole
6A, 7A, 8A Conductor land
7, 8 Terminal insertion hole
9A, 9B, 9C Flexible contact
10A, 10B, 10C Terminal
11 Stationary contact board
11A, 12A Center opening
12 Cover
13 Contact plate
13A Center ring portion
13B Rectangular web portion
14, 21 Rotor
14A Radially oriented ditches and ridges
15 Click spring
15A Flexible pillar
15B Dowel
16, 22 Hole
16A Axle-supporting portion
16B Clearance portion
16C Regular hexagonal hole
17 Sleeve
18 Axle-retaining portion
18A elongated hole
19 Axle return spring
23A Regular hexagonal sphere

What is claimed is:

1. A rotary operating-type electronic device comprising:
   (1) a rotary type component having a stationary body, and a rotor having a non-circular hole in a rotational center thereof and supported rotatably by said stationary body;
   (2) an operating axle fitted and supported at one end thereof by said non-circular hole of said rotor in a manner that said operating axle is rotatable together with said rotor and also said operating axle is freely tiltable;
   (3) an operating knob of one of (a) a discal shape and (b) a polygonal shape having a predetermined width, and attached to one of (c) an intermediate portion and (d) another end portion of said operating axle protruding from said rotor; and
   (4) a linearly-driven type component disposed in a position to be in contact with an outer periphery of said operating axle protruding from said rotor at one of (e) the end portion and (f) the intermediate portion, and said linearly driven type component being operable by applying a force of tilting manipulation to said operating axle.

2. A rotary operating-type electronic device comprising:
   (1) a rotor having a non-circular hole in a rotational center thereof, and supported rotatably by a stationary body of a rotary type component including a stationary contact board and the like;

(2) an operating axle fitted and supported at one end thereof by said non-circular hole of said rotor in a manner that said operating axle is rotatable together with said rotor and also said operating axle is freely tiltable;

(3) an operating knob of either a discal shape or a polygonal shape having a predetermined width, and attached to one of (a) an intermediate portion and (b) another end portion of said operating axle protruding from said rotor of said rotary type component; and (4) a linearly-driven type component disposed in a position to be in contact with an outer periphery of said operating axle protruding from said rotor of said rotary type component at one of (c) an end portion and (d) an intermediate portion, and said linearly-driven type component being operable by applying a force of tilting manipulation to said operating axle.

3. The rotary operating-type electronic device according to claim 2, wherein said non-circular hole in the rotational center of said rotor comprises two portions, one being a non-circular hole portion formed through a certain portion of a width of said rotor, and the other being a clearance hole portion formed through a remaining width portion of said rotor and having a diameter greater than a diameter of said non-circular hole portion, and wherein said operating axle has an exterior shape substantially identical to a shape of said non-circular hole portion, and one end thereof is fitted into and supported by said non-circular hole portion.

4. The rotary operating-type electronic device according to claim 3, wherein said non-circular hole portion of said rotor and said one end of said operating axle fitting therein are substantially regularly polygonal in shape.

5. The rotary operating-type electronic device according to claim 2, wherein said non-circular hole of said rotor is substantially regular polygonal in shape, and said operating axle is provided at one end thereof with a polyhedron having a peripheral shape in cross-section substantially identical to the substantially regular polygonal shape of said substantially regular polygonal hole, and wherein said one end of said operating axle is fitted into and supported by said substantially regular polygonal hole.

6. The rotary operating-type electronic device according to claim 2, wherein said linearly-driven type component comprises a push switch being operable when said operating axle is tiltably manipulated in a direction orthogonal to an axis of said operating axle.

7. The rotary operating-type electronic device according to claim 2, wherein said operating knob of either a discal shape or a polygonal shape having a predetermined width is attached to generally a center portion of said operating axle, and said rotary type component and said linearly-driven type component are constructed in shapes so that a height is tallest at a side closest to said operating knob, and the height declines gradually toward a side farther away from said operating knob, and that the height is also tallest at a center portion in a plane orthogonal to said operating axle, and the height declines as distance from the center portion increases.

8. The rotary operating-type electronic device according to claim 6, wherein said operating knob of either a discal shape or a polygonal shape having a predetermined width is attached to generally a center portion of said operating axle, and said rotary type component and said linearly-driven type component are constructed in shapes so that a height is tallest at a side closest to said operating knob, and the height declines gradually toward a side farther away from said operating knob, and that the height is also tallest at a center portion in a plane orthogonal to said operating axle, and the height declines as distance from the center portion increases.

9. The rotary operating-type electronic device according to claim 2, wherein said rotary type component further comprises a contact plate and a flexible contact point on said stationary body, and said contact plate and said flexible contact point constitute a rotary encoder unit.

10. The rotary operating-type electronic device according to claim 2, wherein said rotor is provided with a plurality of ditches and ridges formed radially along a perimeter on one of surfaces thereof, and said stationary body is provided with a click spring resiliently pressing against said ditches and ridges.

11. The rotary operating-type electronic device according to claim 2, further comprising an axle return spring for biasing said operating axle in a direction that said operating axle returns to an original position thereof, when a force of tilting manipulation being applied thereto is removed.

12. The rotary operating-type electronic device according to claim 3, wherein said linearly-driven type component comprises a push switch being operable when said operating axle is tiltably manipulated in a direction orthogonal to an axis of said operating axle.

13. The rotary operating-type electronic device according to claim 4, wherein said linearly-driven type component comprises a push switch being operable when said operating axle is tiltably manipulated in a direction orthogonal to an axis of said operating axle.

14. The rotary operating-type electronic device according to claim 5, wherein said linearly-driven type component comprises a push switch being operable when said operating axle is tiltably manipulated in a direction orthogonal to an axis of said operating axle.

15. The rotary operating-type electronic device according to claim 3, wherein said operating knob of either a discal shape or a polygonal shape having a predetermined width is attached to generally a center portion of said operating axle, and said rotary type component and said linearly-driven type component are constructed in shapes so that a height is tallest at a side closest to said operating knob, and the height declines gradually toward a side farther away from said operating knob, and that the height is also tallest at a center portion in a plane orthogonal to said operating axle, and the height declines as distance from the center portion increases.

16. The rotary operating-type electronic device according to claim 4, wherein said operating knob of either a discal shape or a polygonal shape having a predetermined width is attached to generally a center portion of said operating axle, and said rotary type component and said linearly-driven type component are constructed in shapes so that a height is tallest at a side closest to said operating knob, and the height declines gradually toward a side farther away from said operating knob, and that the height is also tallest at a center portion in a plane orthogonal to said operating axle, and the height declines as distance from the center portion increases.

17. The rotary operating-type electronic device according to claim 5, wherein said operating knob of either a discal shape or a polygonal shape having a predetermined width is attached to generally a center portion of said operating axle, and said rotary type component and said linearly-driven type component are constructed in shapes so that a height is tallest at a side closest to said operating knob, and the height declines gradually toward a side farther away from said operating knob, and that the height is also tallest at a center portion in a plane orthogonal to said operating axle, and the height declines as distance from the center portion increases.

* * * * *